Figures 1, 2, 3:
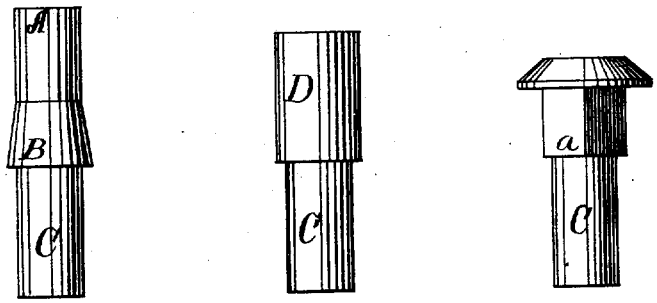

J. B. CLARK.

MANUFACTURE OF CARRIAGE-BOLTS.

No. 7,167. Reissued June 13, 1876.

Witnesses.

H. N. Gale.

Geo. A. Gourdy

Inventor

James B. Clark.

By James Shepard Atty.

N. PETERS, PHOTO-LITHOGRAPHER, WASHINGTON, D. C.

UNITED STATES PATENT OFFICE.

JAMES B. CLARK, OF PLANTSVILLE, ASSIGNOR, BY MESNE ASSIGNMENTS, TO PECK, STOW, AND WILCOX COMPANY, OF SOUTHINGTON, CONN.

IMPROVEMENT IN THE MANUFACTURE OF CARRIAGE-BOLTS.

Specification forming part of Letters Patent No. 96,308, dated November 2, 1869; reissue No. 7,167, dated June 13, 1876; application filed May 10, 1876.

*To all whom it may concern:*

Be it known that I, JAMES B. CLARK, of Plantsville, in the county of Hartford and State of Connecticut, have invented certain new and useful Improvements in the Manufacture of Carriage-Bolts; and I do hereby declare that the following is a full, clear, and exact description thereof, which will enable others skilled in the art to make and use the same, reference being had to the accompanying drawing, making a part of this specification.

The invention relates, mainly, to the blank which is the result of the first step in the manufacture of bolts, which blank is subsequently formed into a square-neck round-headed bolt, the upper end of the square neck being formed by upsetting the metal in the act of forming the head, as hereinafter described.

In the accompanying drawing, Figure 1 is a side elevation of a bolt-blank, the result of the first step in the manufacture of bolts in accordance with my invention. Fig. 2 is a like view of a bolt-blank, the result of the first step in the manufacture of bolts in the ordinary manner; and Fig. 3 is a side elevation of a completed carriage-bolt ready for threading.

Round iron, of a size proper to form the screw end C of a bolt, is first cut into proper lengths, and an enlargement, B, larger than either end of the blank, Fig. 1, is made at the point, which is to be formed into the base of the square neck *a*, Fig. 3. The enlargement B is tapering, and is in the form of a frustum of a cone or pyramid. The base of the enlarged portion B should be of such size that it can be squared into a square, the sides of which are equal to the diameter of the screw end C, while the top of the enlarged portion should be of the same size as the original rod.

In Fig. 1, A and C are of the same size, which is, of course, less than the size of the enlarged portion. A designates the end which is to be upset to form the head.

I prefer to form the enlarged portion by upsetting; but the blank with this enlargement thereon may be formed of a larger-sized iron by forging the same in suitable dies under a power-hammer, or other machine. The blanks being thus formed are reheated, so as to heat the end A and enlarged portion B, and then placed in an ordinary heading-die, with the end C downward, and the dies are then forced together, the angular portion thereof closing upon the enlargement B of the blank, which is of such size as to fill the dies at the point which forms the base of the square neck.

As only a small portion of the enlargement B is of the proper size to make the desired square, it will readily be perceived that there will be but little resistance to closing the dies. When the dies are thus closed, and filled at the base of the square neck, the heading-tool is forced upon the end A, to form the head by upsetting, which operation will also upset the metal at a point below the head, thereby completely filling the angular portion of the dies, and perfecting or finishing the square neck of the bolt.

Ordinarily round-stemmed, square-necked, and round-headed bolts of the class shown in Fig. 3 are formed by first throwing the metal into the form shown in Fig. 2, in which the end to be headed, and the portion which is to be formed into the square neck, are of the same size, and together constitute a cylindrical body, D, of a size sufficient to be formed into a square, the sides of which are equal to the diameter of the screw end C. These blanks, Fig. 2, are squared by pressure between like dies, and in like manner herein described for squaring the base of the taper or enlargement B; but as the whole length of the square neck in this ordinary style is squared all at one time, it will be plainly seen that a great amount of pressure must be used to close the dies, while sometimes the same may not be closed as much as at other times, thus making the size of the square necks vary, and the corners rounded or blunt.

By my process of first throwing the metal into the peculiar blank, and then finishing as described, the square necks of the bolts produced will be of uniform size, and with angular corners, thus producing a better article without increasing the cost, or changing the squaring or heading tools. The wear of the squaring-dies is also much less than it is in the manufacture of bolts by the ordinary process.

I claim as my invention—

The improvement in the manufacture of carriage-bolts, which consists in first forming on the blank, by upsetting, an enlarged portion, B, larger than either end of said blank, and then forming the same into a square-neck round-headed bolt, the upper end of the square neck being formed by upsetting the metal in the act of heading, substantially as described.

JAMES B. CLARK.

Witnesses:

LUCAS C. CLARK,
SALMON C. CLARK.